United States Patent Office 2,915,766
Patented Dec. 8, 1959

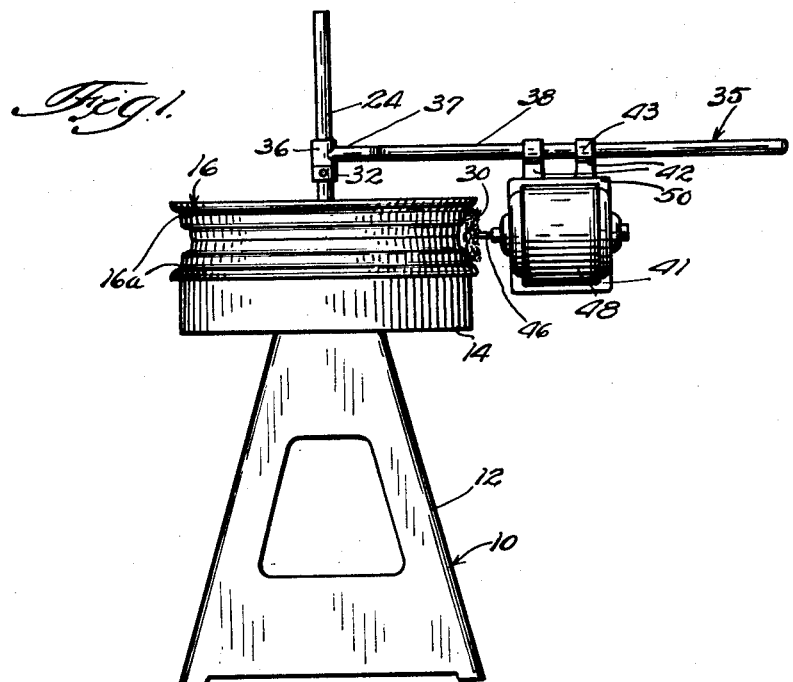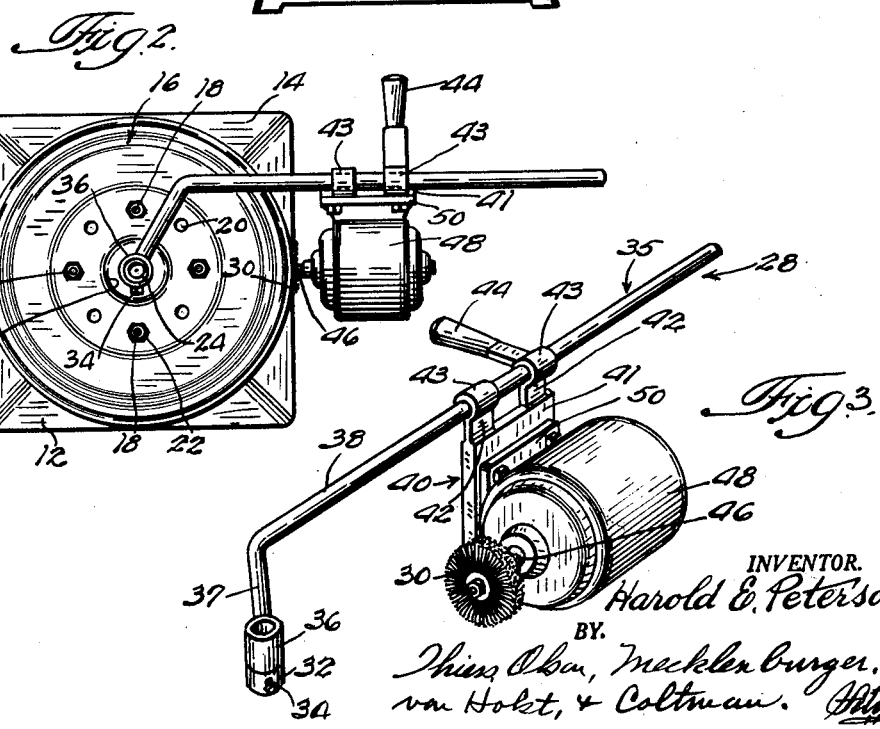

2,915,766

SURFACE ABRADING APPARATUS

Harold E. Peterson, Chicago, Ill.

Application August 4, 1955, Serial No. 526,398

4 Claims. (Cl. 15—21)

The present invention relates to an improved apparatus for abrading surfaces and, more particularly, pertains to a fixture adapted to properly apply abrading means to the rims or annular surfaces of wheels adapted to accommodate tubeless tires.

It is readily apparent to those familiar with vehicular art that the tubeless tire is rapidly gaining in popularity and coming into greater usage for reasons of safety, ease of maintenance, etc.

As the name implies, no separate inner tube need be employed with the tubeless tire and, therefore, an airtight seal must be maintained between the tire peripheral portions defining the tire air cavity and the annular rim surface of a wheel. Because of the intimate airtight contact between the tubeless tire portions contacting the wheel rim and the rim itself, the heat and pressure resulting from prolonged driving effects firm adhesion or welding of rubber particles to the wheel rim. This adhesion is of such an intimate nature as to remain on the wheel rim when the tire itself is removed, the adhering rubber particles having greater adhesive attraction for the wheel rim than cohesive attraction to the remainder of the tire. When a repaired or new tubeless tire is subsequently mounted on the wheel rim, it becomes imperative that the wheel rim be smooth and clean to insure that an airtight seal with the tire peripheral portions is effected.

Thus, it is an object of this invention to provide a fixture and wheel rim cleaning mechanism which is readily mountable on a tire table and which efficiently removes the stubborn rubber adhering particles and other foreign matter disposed about the annular groove defining the wheel periphery.

It is a further object of this invention to provide a device for cleaning the rim portions of wheels which is flexible in operation assuring efficient and facile cleaning of the curved wheel rim portions.

It is another object of this invention to provide a fixture and wheel rim cleaning device which is composed of a minimum number of inexpensive parts resulting in low initial cost and minimum maintenance costs.

In one embodiment of the invention, a tire stand is provided having a wheel-supporting platform mounted thereon. Provided on the platform is means for securing the wheel thereto whereby the axis of the wheel is substantially normal to the platform. Projecting upwardly from the platform and coaxial with the wheel axis is an elongated shaft-like member. A fixture is provided which is rotatably mounted on the elongated member and is adjustable longitudinally thereof. The fixture includes a rod having a radially extending proximal portion accommodating the elongated member and a distal portion extending angularly therefrom. Slidably and rotatably mounted on the distal portion of the rod is a bracket on which a motor is affixed. The drive shaft of the motor is disposed radially of the elongated member and has affixed to the end thereof, adjacent the wheel rim, a cleaning element.

For a more complete understanding of the invention, reference should now be had, wherein Fig. 1 is a front elevational view of a wheel stand with the improved apparatus shown mounted thereon;

Fig. 2 is a top plan view of Fig. 1; and

Fig. 3 is a perspective view of the improved apparatus with the rim abrading device affixed thereto.

Referring now to the drawing and, more particularly, to Fig. 1, a tire stand 10 is illustrated comprising an upright base 12 on which is mounted a horizontal platform 14. A vehicle wheel 16, the peripheral rim surface area of which is to be cleaned, is mounted in overlying relation on the platform 14 and secured thereto, in this instance, by means of four symmetrically arranged stud members 18 which extend upwardly from or are perpendicular to the platform 14. The stud members 18 are adapted to project through corresponding apertures 20 formed in the wheel 16. The apertures are a fixed radial distance from the axis of the wheel member and are adapted, when assembled on a vehicle, to accommodate studs provided on the brake drum of such vehicle. Nut members 22 are provided which threadedly engage the end portions of the stud members 18 and thereby secure the wheel 16 to the platform 14.

Centrally mounted on platform 14 and extending upwardly therefrom in a direction coaxial with respect to the wheel axis is a shaft 24 which traverses the central aperture 26 in the wheel member 16. A fixture 28 to which is attached a motor driven wire brush 30 is rotatably mounted on the portion of the shaft 24 projecting above the wheel member 16.

The fixture 28, which is the essence of the invention, comprises a collet 32 which slidably accommodates the shaft 24, and is fixedly secured thereto at a selected position by means of a setscrew 34 carried by the collet and adjustable radially of the shaft 24. The position of the collet 32 on shaft 24 will be dependent upon the axial dimension of the wheel to be cleaned. Disposed above the collet 32 and slidably engaging the same, is an elongated rotatable supporting arm 35. Affixed to one end of arm 35 is a collar 36 which accommodates shaft 24 and bears against the upper surface of collet 32. The arm 35 includes a proximal or inner portion 37 and distal or outer portion 38. Portion 37 is relatively short and extends in a radial direction from the axis of collar 36, and portion 38 is integral with the outer end of portion 37 and extends angularly therefrom. The importance of the angular disposition between arm portions 37 and 38 will become apparent from the discussion to follow hereinafter. Once the desired height of the collet 32 on the shaft 24 has been attained, arm 35 is free to rotate 360 degrees about the shaft 24.

Slidably and rotatably secured to arm portion 38 is a bracket 40 to which is affixed abrading means for removing rubber or other foreign matter deposited on the peripheral rim surface 16a of the wheel 16, see Fig. 1. The bracket 40 includes an apertured plate 41; a pair of lugs 42 extending laterally from one side of the plate; axially aligned, relatively spaced sleeve members 43 integral with the free ends of lugs 42 and slidably and rotatably accommodating arm portion 38; and an elongated handle 44 extending angularly from one of said members 43. The handle 44 enables the operator to readily slide and rotate the bracket 40 relative to arm portion 38.

The abrading wheel or brush 30, heretofore mentioned, is affixed to the drive shaft 46 of a motor 48, the latter having the base 50 thereof secured to bracket plate 41. Another type of tool may be affixed to the motor shaft other than that shown without departing from the scope of this invention. By reason of the angular disposition of arm portions 37 and 38, the axis of the motor drive shaft is radially disposed with respect to shaft 24, thereby assuring that a maximum portion of the brush 30 will come in contact with the wheel rim portion 16a at any given time.

When operating the apparatus, the operator positions the brush 30 intermediate the rim flanges 16a by manipulating the bracket 40 longitudinally of arm portion 38. Depending upon which rim flange surface 16a (upper or lower) is to be cleaned first, the operator manipulates with one hand the handle 44 in either a clockwise or counterclockwise direction about arm portion 38 until the periphery of the brush 30 contacts the desired rim surface. Upon the motor being energized, the operator grasps with his other hand the free end of arm portion 38 and moves the bracket and the brush-motor assembly around the periphery of the wheel and readily removes rubber or other foreign matter from the rim surface.

It is apparent that the length of arm portion 38 enables wheels of various diameters to be readily cleaned. In addition, the vertical adjustment of the collet 32 and the rotational adjustment of the improved bracket 40 with respect to arm portion 38, enables wheels of various axial dimensions to be readily cleaned.

Thus, an apparatus has been provided for cleaning the peripheral rim surface of a wheel which is composed of a minimum number of parts, possesses great flexibility, and is so constructed as to insure adequate abrading action over the entire peripheral rim surface of the wheel to be cleaned.

It is apparent that many modifications can be made of the illustrated apparatus which will still remain within the ambit of the inventive concept provided. The invention is to be limited, therefore, only by the scope of the appended claims.

I claim:

1. In a device for abrading the periphery of a fixedly positioned annular member, the combination comprising a rod lying in a horizontal plane with a bent portion having a collar end limit and a distal portion extending from said bent portion beyond said annular member, a supporting pivot concentric with such annular member to be abraded engaging said rod collar end limit and disposed adjacent to and against a surface of said annular member whereby the rod may freely rotate 360°, a support plate having rod-engaging means slidably engageable with said distal portion of said rod beyond said annular member, motive means and rotatable abrading means driven thereby secured to said support plate and movable by said support plate beyond said annular member, the rotating axis of said abrading means being continuously disposed radially of said supporting pivot when said abrading means is held in operative position by said support plate.

2. In a device for abrading the peripheral portion of a fixedly positioned member, the combination comprising a rod lying in a horizontal plane having a collar end limit formed integrally with a short length of said rod, an elongate distal rod portion formed integrally with said short rod length and angularly disposed thereto, a supporting pivot concentric with such annular member to be abraded and disposed adjacent one surface thereof engaging said rod collar end limit whereby said latter end limit is freely rotatable thereabout and said distal rod portion extends beyond such annular member, a support plate having rod-engaging means slidably engageable with said distal rod portion, and rotatable abrading means secured to said support plate, the rotating axis of said abrading means being continuously disposed radially of said supporting pivot when said abrading means is held in operative position, and handle means secured to said support plate whereby the disposition of the rotatable abrading means relative to the periphery of such annular member may be regulated so as to be held in said operative position.

3. The device as recited in claim 2 in which the length of said rod elongate portion is sufficient to enable the end thereof to be constantly employed as a manually engageable handle during the entire course of the pivotal movement of said rod about said supporting pivot.

4. A sleeve member adapted to engage with the upper end of a vertical supporting shaft, a horizontal member extending laterally from and fixed to the sleeve, said member comprising horizontal angularly related inner and outer portions, a collar mounted for rotative and longitudinal adjustment on the outer portion of said member, a pair of arms fixed to said collar extending transversely thereof and angularly spaced around said collar, a motor mounted at the outer end of one arm, the shaft of the motor being parallel to said outer portion of the member and extending in the direction of said sleeve, and a rotatable buffer mounted on said motor shaft.

References Cited in the file of this patent

UNITED STATES PATENTS

| | | |
|---|---|---|
| 866,522 | Scanlon | Sept. 17, 1907 |
| 1,483,640 | Manning | Feb. 12, 1924 |
| 1,633,885 | Castillo | June 28, 1927 |
| 1,820,305 | Farmer | Aug. 25, 1931 |
| 2,115,908 | Fox | May 3, 1938 |
| 2,452,926 | Gruetjen | Nov. 2, 1948 |
| 2,729,842 | Stamos | Jan. 10, 1956 |
| 2,739,434 | Bell | Mar. 27, 1956 |